(12) United States Patent
Therrian et al.

(10) Patent No.: US 12,439,493 B2
(45) Date of Patent: Oct. 7, 2025

(54) DYNAMIC TEMPERATURE REGULATION SYSTEM FOR A LIGHT HEAD

(71) Applicant: The Charles Machine Works, Inc., Perry, OK (US)

(72) Inventors: Joshua J. Therrian, Whitewater, WI (US); Brian R. Hale, Lake Mills, WI (US)

(73) Assignee: The Charles Machine Works, Inc., Perry, OK (US)

( * ) Notice: Subject to any disclaimer, the term of this patent is extended or adjusted under 35 U.S.C. 154(b) by 98 days.

(21) Appl. No.: 18/433,655

(22) Filed: Feb. 6, 2024

(65) Prior Publication Data
US 2024/0276616 A1    Aug. 15, 2024

Related U.S. Application Data

(60) Provisional application No. 63/484,244, filed on Feb. 10, 2023.

(51) Int. Cl.
*H05B 45/56* (2020.01)
*F16L 55/10* (2006.01)

(52) U.S. Cl.
CPC .................... *H05B 45/56* (2020.01)

(58) Field of Classification Search
CPC ........ H05B 45/56; H05B 47/00; H05B 47/10; F16L 55/00; F16L 55/10; F16L 55/26
See application file for complete search history.

(56) References Cited

U.S. PATENT DOCUMENTS

| | | | |
|---|---|---|---|
| 4,135,958 A | 1/1979 | Wood | |
| 4,581,247 A | 4/1986 | Wood | |
| 4,680,066 A | 7/1987 | Wood | |
| 5,195,392 A * | 3/1993 | Moore | F16L 55/18 356/241.3 |
| 5,280,811 A | 1/1994 | Catallo et al. | |
| 5,868,169 A | 2/1999 | Catallo | |
| 5,915,419 A | 6/1999 | Tweedie et al. | |
| 5,927,341 A | 7/1999 | Taylor | |
| 6,029,726 A | 2/2000 | Tweedie et al. | |

(Continued)

FOREIGN PATENT DOCUMENTS

| | | |
|---|---|---|
| AU | 20030244547 B1 | 12/2004 |
| DE | 10221149 A1 | 11/2003 |

(Continued)

OTHER PUBLICATIONS

Sewertronics S.L. "SpeedyLight/SpeedyLight+" User Manual, Sep. 2018, 38 pages, Madrid-Spain.

*Primary Examiner* — Thai Pham
(74) *Attorney, Agent, or Firm* — Tomlinson McKinstry, P.C.

(57) ABSTRACT

A system for regulating the temperature of a light source positioned within a liner soaked in resin and installed within an underground pipeline. The system measures the temperature of light emitting diodes supported on the light source as the light source is pulled through the liner to cure the resin. The system is configured to automatically stop the curing process and subsequently step down the power level and the rate of travel of the light source each time a designated temperature threshold is reached. Power is indefinity shut down to the light source if a maximum temperature is reached.

20 Claims, 11 Drawing Sheets

(56) References Cited

U.S. PATENT DOCUMENTS

| | | |
|---|---|---|
| 6,039,079 A | 3/2000 | Kiest, Jr. |
| 6,068,725 A | 5/2000 | Tweedie et al. |
| 6,199,591 B1 | 3/2001 | Kiest, Jr. et al. |
| 6,371,631 B1 | 4/2002 | Reutemann |
| 6,427,726 B1 | 8/2002 | Kiest, Jr. |
| 6,482,280 B1 | 11/2002 | Kiest, Jr. et al. |
| 6,520,719 B1 | 2/2003 | Tweedie et al. |
| 6,708,728 B2 | 3/2004 | Driver et al. |
| 6,782,932 B1 | 8/2004 | Reynolds, Jr. et al. |
| 7,073,536 B2 | 7/2006 | Blackmore et al. |
| 8,561,662 B2 | 10/2013 | Moeskjaer et al. |
| 8,869,839 B1 | 10/2014 | D'Hulster |
| 9,248,605 B2 | 2/2016 | Quitter |
| 9,453,607 B2 | 9/2016 | Moeskjaer et al. |
| 9,920,872 B2 | 3/2018 | Lokkinen |
| 10,591,102 B2 | 3/2020 | Mathey et al. |
| 11,391,406 B2 | 7/2022 | Dahl-Nielsen et al. |
| 11,859,753 B2 * | 1/2024 | Rasmussen ......... F16L 55/1654 |
| 2001/0046652 A1 | 11/2001 | Ostler et al. |
| 2003/0213556 A1 | 11/2003 | Blackmore et al. |
| 2005/0154262 A1 | 7/2005 | Banik et al. |
| 2005/0222295 A1 | 10/2005 | Siegel |
| 2006/0090804 A1 | 5/2006 | Driver et al. |
| 2006/0130923 A1 | 6/2006 | Lepola et al. |
| 2007/0261751 A1 | 11/2007 | Lepola |
| 2009/0014080 A1 | 1/2009 | Blackmore et al. |
| 2010/0051168 A1 * | 3/2010 | Moeskjaer ............ F16L 55/165 156/64 |
| 2014/0261832 A1 | 9/2014 | Kiest, Jr. et al. |
| 2014/0311607 A1 | 10/2014 | Mathey et al. |
| 2016/0010781 A1 | 1/2016 | Kiest, Jr. et al. |
| 2016/0195211 A1 | 7/2016 | Lokkinen |
| 2018/0106413 A1 | 4/2018 | Kuzniar |
| 2018/0162017 A1 | 6/2018 | Kuzniar |
| 2018/0194072 A1 | 7/2018 | Kuzniar |
| 2018/0229424 A1 | 8/2018 | Bichler et al. |
| 2019/0137027 A1 | 5/2019 | Robinson et al. |
| 2020/0003354 A1 * | 1/2020 | Kanres .................... F16L 55/18 |
| 2020/0049301 A1 | 2/2020 | Rasmussen et al. |
| 2020/0300403 A1 * | 9/2020 | Taylor ................. F16L 55/1651 |
| 2021/0172556 A1 * | 6/2021 | Dahl-Nielsen .......... F16L 55/18 |

FOREIGN PATENT DOCUMENTS

| | | |
|---|---|---|
| DE | 102007038197 A1 | 2/2009 |
| DE | 102010035837 A1 | 3/2012 |
| EP | 0551790 A1 | 7/1993 |
| EP | 2141404 B1 | 4/2011 |
| EP | 2208920 B1 | 2/2012 |
| GB | 2342419 A | 4/2000 |
| JP | 2008142996 A | 6/2008 |
| JP | 2008175381 A | 7/2008 |
| KR | 100594825 B1 | 7/2006 |
| KR | 1020140111057 A | 9/2014 |
| WO | 9315131 A | 8/1993 |
| WO | 9501860 A | 1/1995 |
| WO | 9510726 A | 4/1995 |
| WO | 9618493 A | 6/1996 |
| WO | 2004104469 A1 | 12/2004 |

* cited by examiner

DYNAMIC TEMPERATURE REGULATION SYSTEM FOR A LIGHT HEAD

RELATED APPLICATIONS

This application claims the benefit of U.S. provisional patent application Ser. No. 63/484,244, authored by Therrian et al., and filed on Feb. 10, 2023, the entire contents of which are incorporated herein by reference.

SUMMARY

The present disclosure is directed to a system comprising a pressurized chamber having a reel installed therein, and a flexible tubular liner configured to be wound around the reel. The liner is extendable into an elongated configuration. The system further comprises a light source and a propulsion unit. The light source is attached to a power line and comprises a plurality of light emitting diodes. The light source and the power line are configured to extend within the liner when the liner is in the elongated configuration. The propulsion unit is configured to move the light source within the liner at a desired rate of travel.

The system even further comprises a controller in communication with the light source and the propulsion unit. The controller is configured to monitor a temperature of an area adjacent the light emitting diodes and to shut down power to the light emitting diodes and stop movement of the light source if the temperature reaches a first temperature threshold. Thereafter, the controller is configured to resume power to the light emitting diodes at a decreased power output and resume movement to the light source at a decreased rate of travel.

The present disclosure is also directed to an apparatus comprising a controller. The controller is configured to be in communication with a light source comprising a plurality of light emitting diodes and a propulsion unit mechanically coupled to the light source. The light source is configured to be installed within a tubular liner positioned below a ground surface and is configured to be moved at a rate of travel within the liner by the propulsion unit. The controller is configured to monitor a temperature of an area adjacent the light emitting diodes and to shut down power to the light emitting diodes and stop movement of the light source if the temperature reaches a first temperature threshold. Thereafter, the controller is configured to resume power to the light emitting diodes at a decreased power output and resume movement to the light source at a decreased rate of travel.

DETAILED DESCRIPTION

Figure 1:
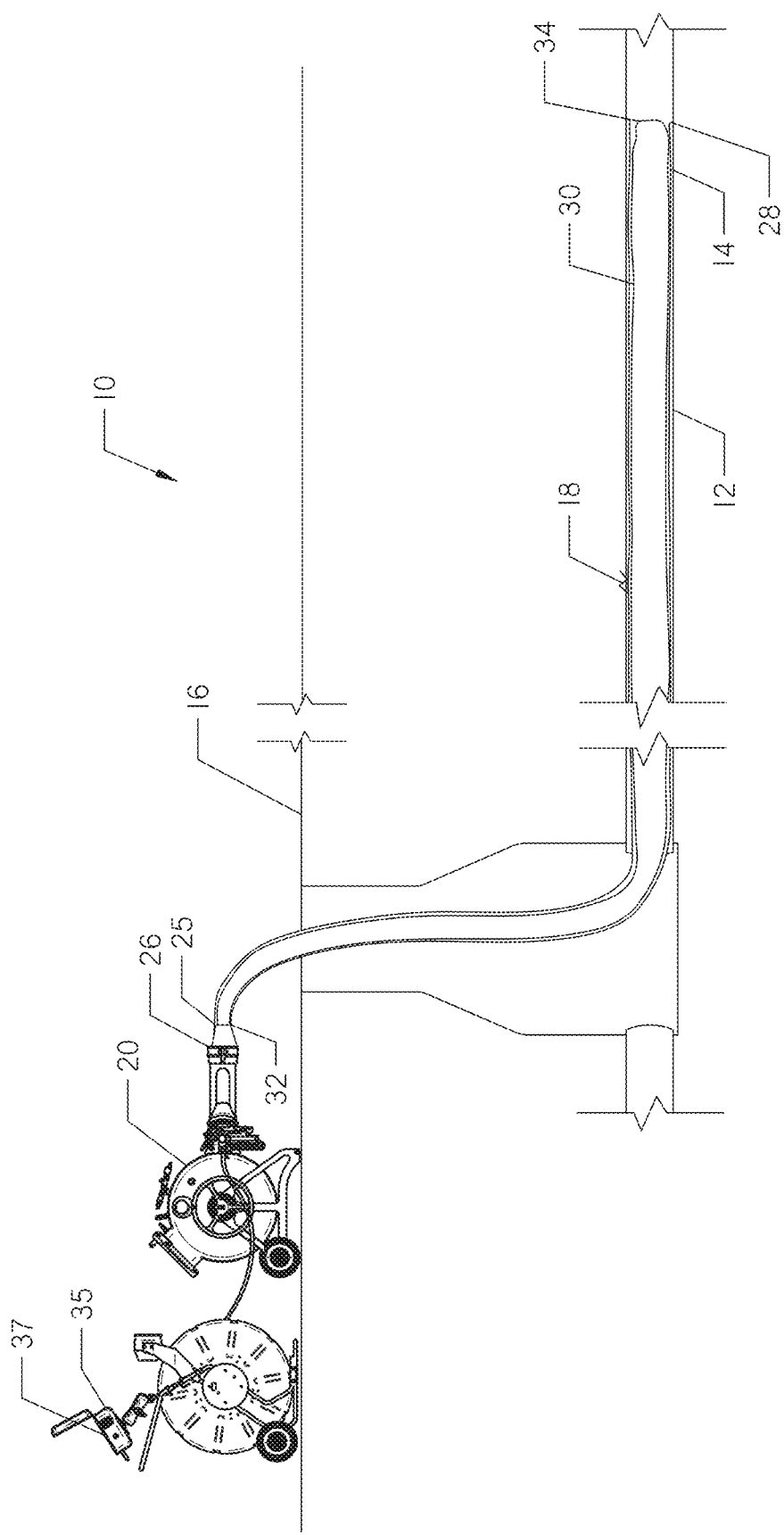
FIG. 1 is an illustration of a cured-in-place piping operation.

With reference to FIG. 1, a cured-in-place piping operation 10 is shown. Cured-in-place piping ("CIPP") operations are performed to repair existing underground pipelines, such as a pipeline 12, shown in FIG. 1. The operation involves the installation of a resin saturated, tubular liner 14 within the pipeline 12 situated below a ground surface 16. The resin soaked or wet liner 14 cures against the interior of the pipeline 12 and seals any cracks or damaged areas, such as the damaged area 18, shown in FIG. 1. A pressurized inversion drum 20 situated at the ground surface 16 is used to install the flexible and tubular liner 14 within the existing pipeline 12.

Figure 5:
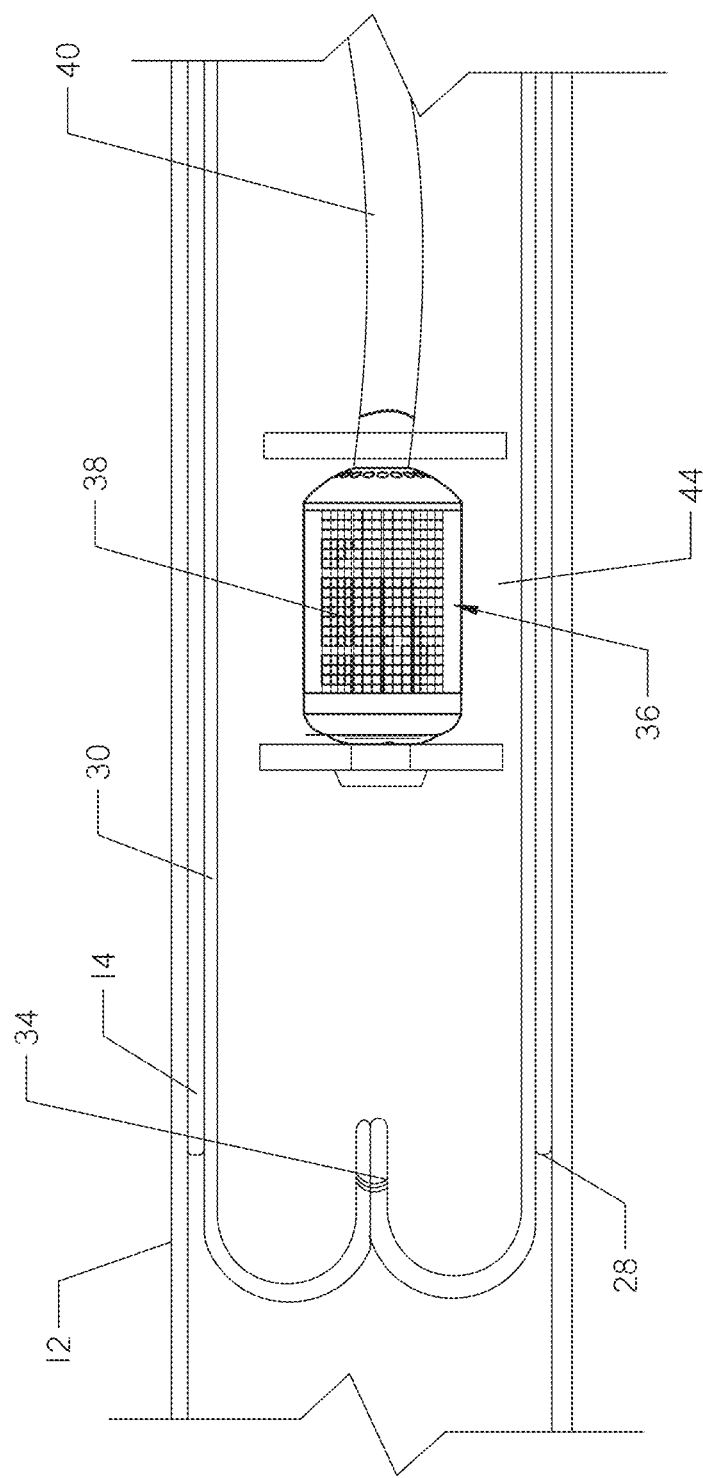
FIG. 5 is an enlarged view of the starting point for the light source within the pipeline 12 shown in FIG. 2.

In some embodiments, water or steam may be used to cure the resin. In other embodiments, light emitting diodes ("LEDs") emitting a specific wavelength of light are used to cure the resin. In such embodiment, the resin is formulated to cure upon exposure to the specific wavelength of light emitted by the LEDs. For example, the LEDs may emit blue light. The operation 10 shown in FIG. 1 uses LEDs to cure the resin. To use LEDs to cure the resin, a plurality of LEDs 38 are supported on a light source or light head 36, as shown in FIG. 5.

Figure 2:
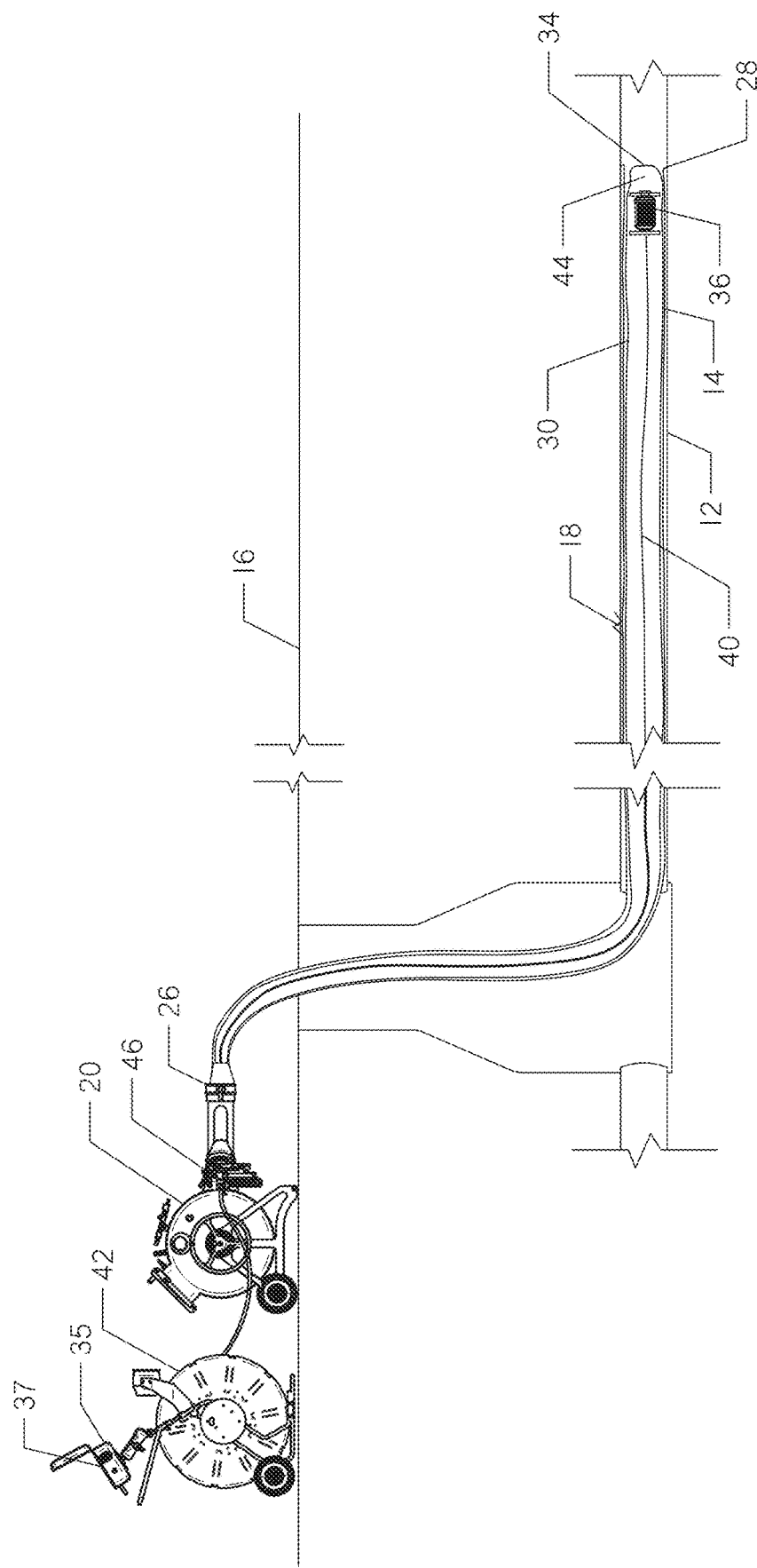
FIG. 2 is the illustration shown in FIG. 1, with a light source installed within the underground pipeline.

Turning to FIG. 2, the light source 36 is attached to a power line 40 used to power and push or pull the light source 36 throughout the length of the liner 14. The power line 40 is stored on a reel installed within a drum 42. The drum 42 is situated at the ground surface 16 adjacent the pressurized inversion drum 20. In addition to the LEDs 38, the light source 36 comprises a camera, as well as one or more sensors used to measure various operating conditions of the light source 36 when installed within the liner 14. An example light source is described in U.S. Pat. No. 8,561,662 issued to Moeskjaer, et al., the entire contents of which are incorporated herein by reference.

Power and movement of the light source 36 is controlled by a computer or controller 35 supported on or situated adjacent the drum 42. The controller 35 comprises a monitor 37 configured to display current operating conditions for the light source 36 and/or video feed from the light source's camera on the monitor's display screen 50, as shown for example in FIGS. 8-11. The controller 35 further comprises a control center configured for human input and interaction with the controller 35. The control center may comprise manual controls positioned adjacent the display screen 50 or comprise a touch screen or interface included in the monitor's display screen 50.

Continuing with FIGS. 1 and 2, one challenge with using LEDs 38 to cure the resin is that a given amount of light energy per volume unit of resin at the wavelength required must be evenly distributed throughout the wet liner 14 as the light source 36 is pulled through the pipeline 12. The higher the light energy produced, the faster the job can be completed. However, high energy, even with the use of efficient LEDs 38, means that waste heat is produced. The waste heat may be increased by factors outside of the LEDs 38, such as the ambient conditions of the pipeline 12, the temperature of the wet liner 14, and the heat produced by the chemical reaction of the cure process. If the waste heat is not removed from the enclosed confines of the pipeline 12, then the LEDs 38 may overheat and be permanently damaged.

One method of limiting waste heat is to supply air to the light head 36 during operation. For example, an air compressor (not shown) may be supported on the ground surface 16 and connected to the light head 36 via an elongate air tube included within or attached to the power line 40. During operation, the air compressor routinely supplies air to the light head 36 to cool the LEDs 38. However, the air supplied by the air compressor may not be sufficient to cool the LEDs 38 if, for example, the ambient outside temperature is high.

As will be described herein, the present application discloses various embodiments of a regulation system for regulating the temperature of the LEDs 38 supported on the light source 36. The regulation system is included in or programmed into the controller 35 and may operate in the background during a CIPP operation 10. For example, the regulation system may be subroutines of a larger control program. The regulation system is configured to vary the power output of the light source 36 and to vary the rate of travel of the light source 36 through the liner 14 so as to regulate the temperature of the LEDs 38 while continuing to sufficiently cure the resin.

Turning back to FIG. 1, the interior of the liner 14 is typically made of felt, while the outside of the liner 14 is typically made of a water-resistant material. In operation, the felt interior of the liner 14 is first filled with resin. The resin-filled liner 14 is flattened by running it through a roller table. The flattened liner 14 is then coiled around a reel 22 supported within an interior chamber 24 of the inversion drum 20, as shown in FIG. 3.

Figure 3:
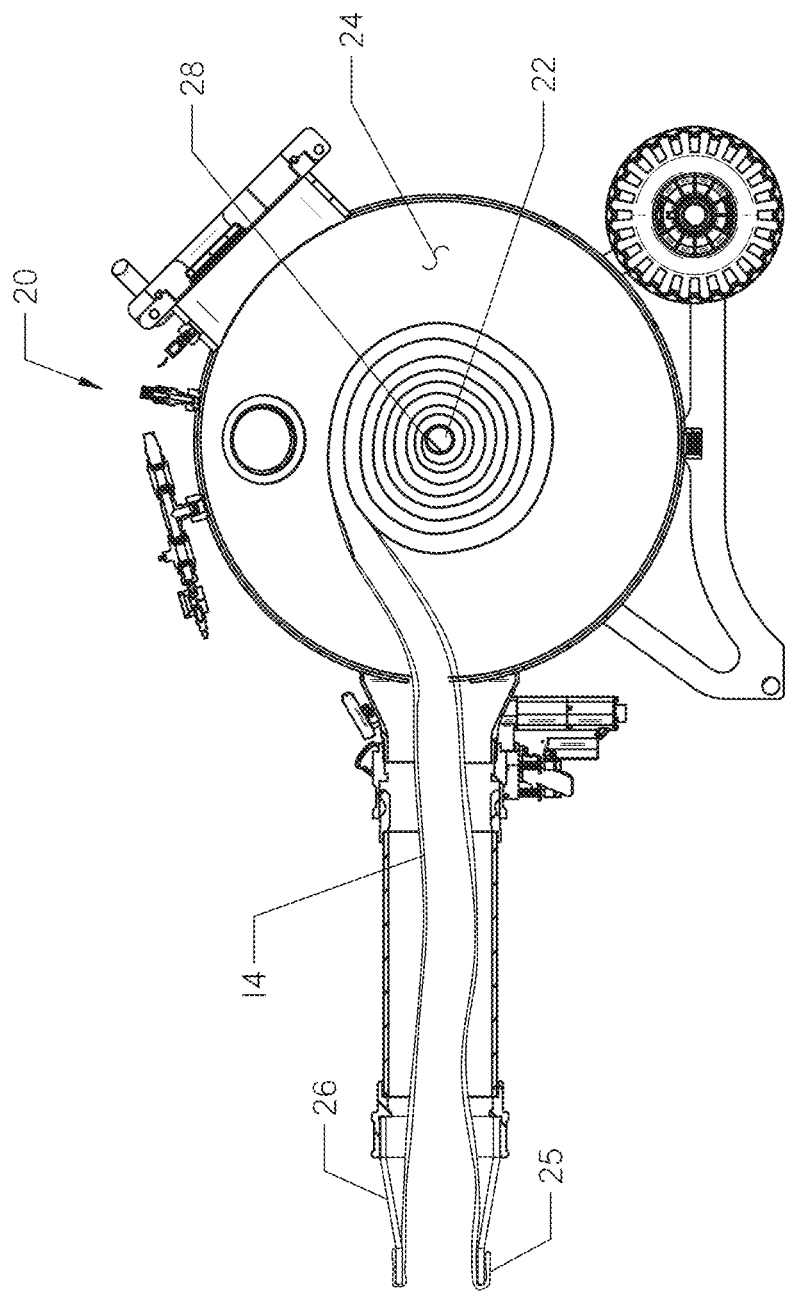
FIG. 3 is a side sectional view of the inversion drum shown in FIG. 1. A wet liner is shown wound around the reel inside of the drum. An end of the liner is shown disposed over the drum's nozzle.

After the wet liner 14 is installed within the inversion drum 20, a first end 25 of the liner 14, is disposed around a nozzle 26 supported on the drum 20, causing the first end 25 to be the fixed end of the liner 14, as shown in FIG. 3. An opposed free end 28 of the liner 14 remains wound around the reel 22. After the first end 25 of liner 14 is disposed around the nozzle 26, the interior of the inversion drum 20 is pressurized.

The pressure inside of the inversion drum 20 operates to invert and expand the liner 14 into the existing pipeline 12 as it is discharged from the nozzle 26, as shown in FIG. 1. Because the liner 14 is inverted as it expands the length of the existing pipeline 12, the resin soaked surface of the liner 14 contacts the interior walls of the pipeline 12.

In some cases, a flexible and tubular bladder 30 is subsequently expanded throughout the length of the installed wet liner 14. The bladder 30 is approximately the same length as the liner 14 and is inverted into the wet liner 14 in the same manner as the wet liner 14 is inverted into the pipeline 12. A fixed end 32 of the bladder 30 is disposed around the nozzle 26 and a free end 34 of the bladder 30 is wound around the reel 22. As the bladder 30 inverts within the wet liner 14, the bladder 30 inflates and pushes against the liner 14, thereby ensuring that the liner 14 contacts all of the interior walls of the pipeline 12, as shown in FIG. 1. The bladder 30 may also be referred to as a calibration tube.

Turning back to FIG. 2, after the wet liner 14 and the bladder 30 are installed within the pipeline 12, the light source 36 with the LEDs 38 turned off, is installed within the pipeline 12 using the power line 40. The light source 36 is moved through the pipeline 12 until the light source 36 reaches the free end 28 of the wet liner 14 and the free end 34 of the bladder 30, as shown in FIGS. 2 and 5. Such position is considered a starting point 44 for the light source 36.

Figure 4:
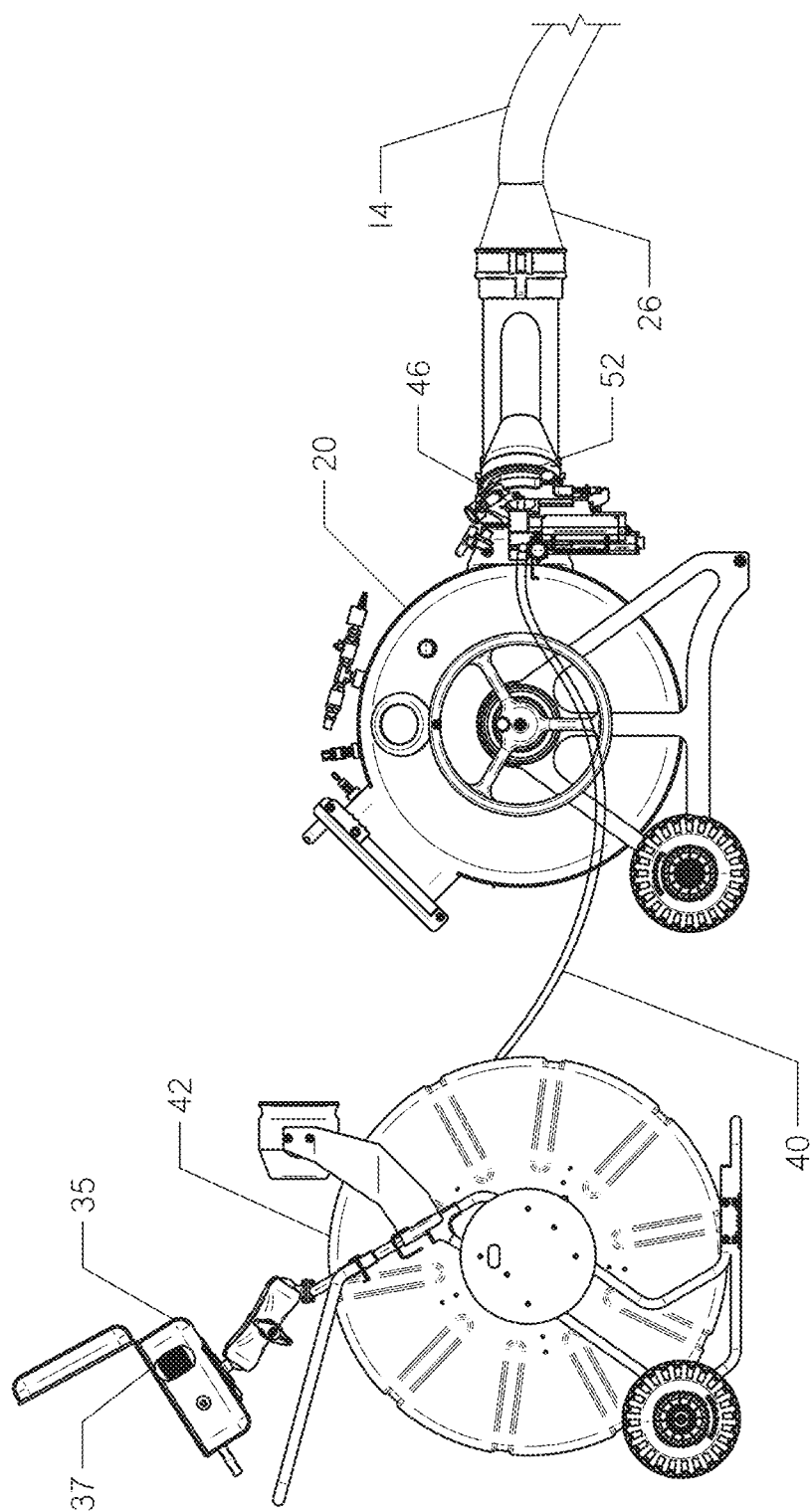
FIG. 4 is an enlarged view of the inversion drum and the drum supporting the light source shown in FIG. 2.

One method of delivering the light source 36 to the starting point 44 is to grip and push the power line 40 using a propulsion unit 46 attached to the inversion drum 20. The propulsion unit 46 is attached to an access port 52 formed in the side of the nozzle 26, as shown in FIG. 4. The propulsion unit 46 comprises gripping mechanisms configured to push the power line 40 within the liner 14. In alternative embodiments, the light source 36 may be attached to the free end 34 of the bladder 30 and pulled to the starting point 44 as the bladder 30 expands through the length of the liner 14.

Continuing with FIGS. 2 and 5, once the light source 36 reaches the starting point 44, the LEDs 38 supported on the light source 36 are turned on. The power line 40 is then pulled back through or retracted from the pipeline 12 towards the inversion drum 20 using the propulsion unit 46. The LEDs 38 cure the resin as the light source 36 is pulled through the pipeline 12. The propulsion unit 46 is configured to pull the power line 40 and light source 36 through the pipeline 12 at a steady speed to ensure that the light source 36 adequately cures all of the resin. The speed at which the gripping mechanisms included in the propulsion unit 46 pull the power line 40 through the liner 14 is set by the controller 35.

Turning to FIGS. 8-11, during operation, the monitor 37 is configured to display on its display screen 50 the current operating conditions for the light source 36. The display screen 50 shown in FIGS. 8-11 displays a power output gauge 54, depicting the current percentage of power supplied to the light source 36, and a pressure gauge 56, depicting the current pressure within the liner 14 and surrounding the light source 36. The display screen 50 further displays a temperature gauge 58, depicting the current temperature of the LEDs 38 or the area adjacent to or surrounding the LEDs, and a speedometer 60, depicting the current rate of travel of the light source 36 through the liner 14. Other conditions related to the CIPP operation 10 may also be shown on the display screen 50, as shown in FIGS. 8-11. FIGS. 8-11 depict one example of how the various operating conditions related to the light source 36 and CIPP operation 10 may be displayed. In alternative embodiments, the operating conditions may be displayed using other types of visual gauges or displays known in the art.

Figure 6:
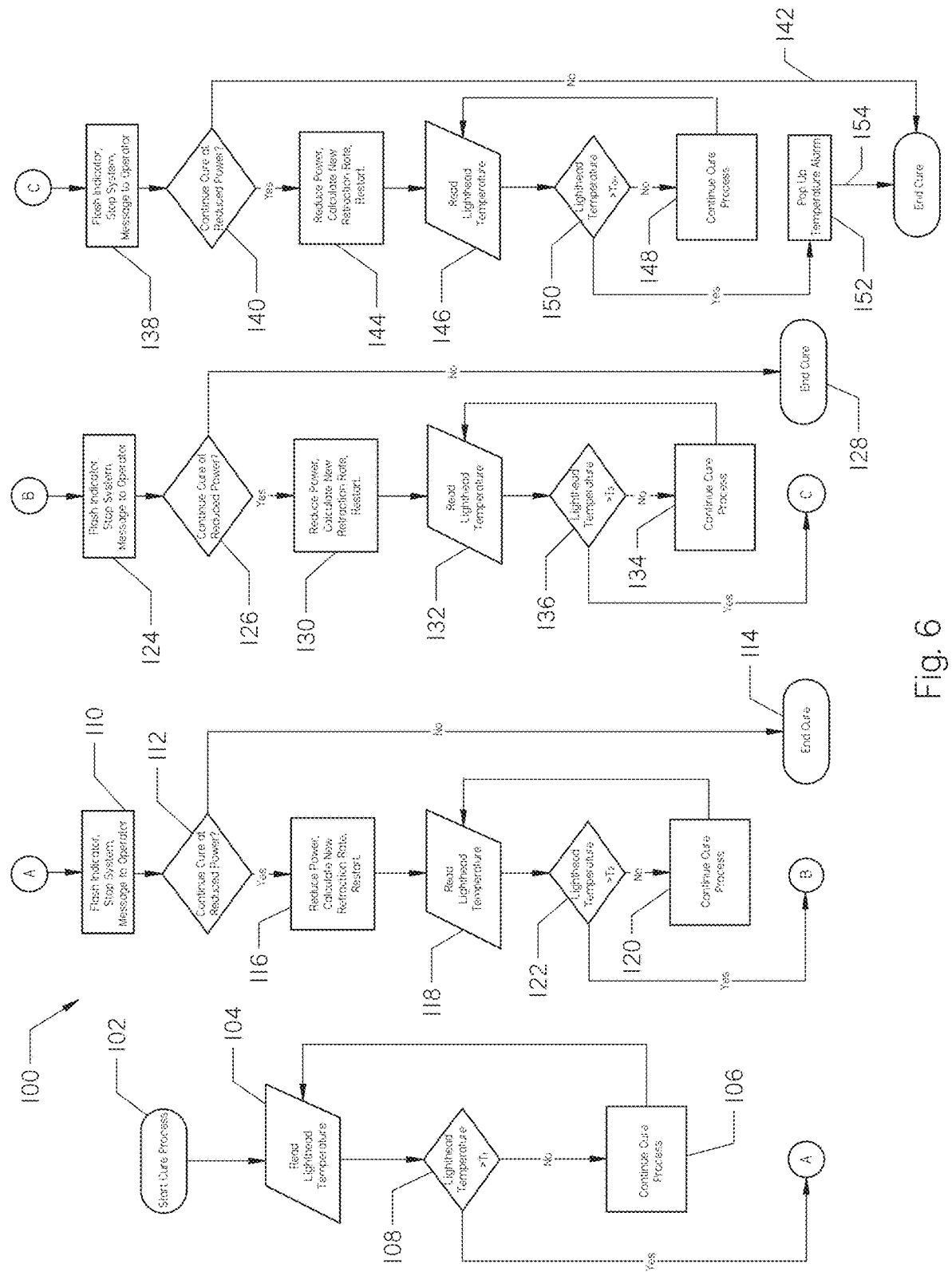
FIG. 6 is a flowchart of one embodiment of a regulation system disclosed herein.
Figure 7:
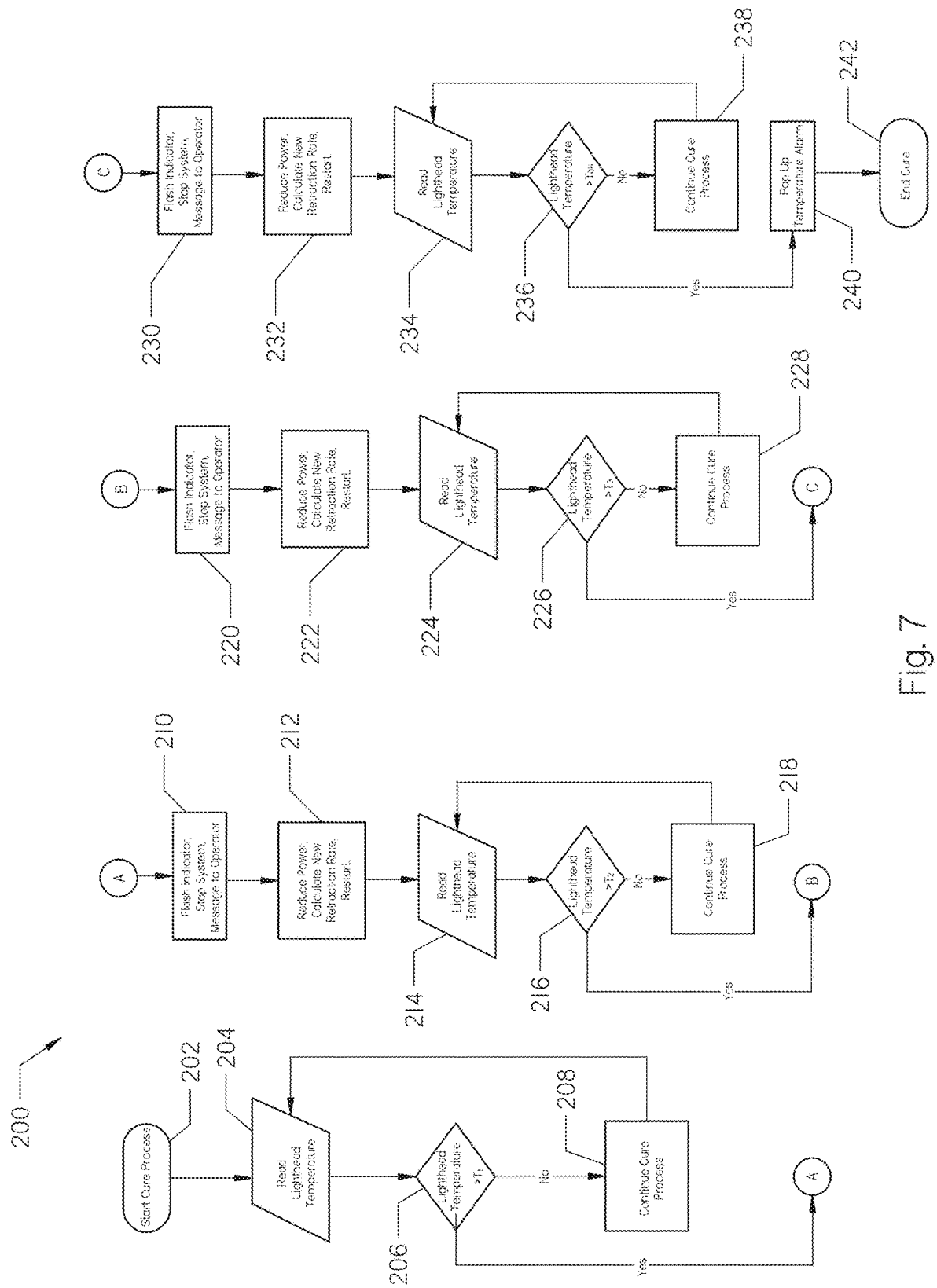
FIG. 7 is a flowchart of another embodiment of a regulation system disclosed herein.

Turning to FIGS. 6 and 7, flowcharts depicting a first and second embodiment of the regulation system 100 and 200 are shown. The first embodiment of the regulation system 100, shown in FIG. 6, requires an operator to make decisions on how to proceed during operation. In contrast, the second embodiment of the regulation system 200, shown in FIG. 7, operates automatically without any required operator input. In both embodiments, the regulation systems 100 and 200 are programmed to notify an operator of incremental increases in temperature of the LEDs 38 during operation and notify the operator when a maximum temperature for the LEDs 38 is reached. The LEDs 38 are likely to overheat and become damaged if the maximum temperature is exceeded. The incremental increases in temperature are referred to herein as threshold temperatures.

The regulation systems 100 and 200 shown in FIGS. 6 and 7 each utilize three threshold temperatures, T1-T3. However, the regulation systems 100 and 200 may be configured or programed to reach as many threshold temperatures as desired before a maximum temperature is reached. The degree of each threshold temperature and the amount of threshold temperatures may be decided by an operator prior to each operation or may be pre-programmed into the system 100 or 200 such that the same temperatures are used for each operation.

As described below, if a threshold temperature is reached during the operation of either regulation system 100 or 200, the curing process is stopped and resumed at a lower power level supplied to the light source 36. The power level may be reduced each time a threshold temperature is reached. Supplying a reduced amount of power to the light source 36 helps prevent the LEDs 38 from overheating. The step down of the level of power supplied to the light source 36 each time a threshold temperature is reached may be pre-programmed into the regulation systems 100 or 200 or may be set by an operator before or during each curing operation 10. Alternatively, the controller 35 may be programmed to automatically calculate the optimal reduced power level for the light source 36 based on the operating conditions of the light source 36 each time a threshold temperature is reached.

As further described below, if the power supplied to the light source 36 is reduced, the rate of travel or retraction rate of the light source 36 through the liner 14 must also be reduced so that the resin has sufficient time to cure. The rate of travel required to adequately cure the resin is calculated by the controller 35. Once the new retraction rate is determined, the controller 35 directs the propulsion unit 46 to pull the light source 36 through the liner 14 at the new reduced rate of travel.

Continuing with FIG. 6, the first embodiment of the regulation system 100 starts operating once the light source 36 reaches the starting point 44 within the liner 14, the LEDs 38 are turned on, and the cure process is started, as shown by step 102. At the start of the curing process, the LEDs are operated at full or near full power and the light source 36 is pulled back through the liner 14 at the maximum allowed rate of travel. As the light source 36 moves through the liner 14, one or more sensors on the light source 36 continuously measure the temperature of the LEDs 38 and transmit the measured data to the controller 35, as shown by step 104. The controller 35 continually samples or reads the temperature data from the one or more sensors and displays the temperature measured by the sensors on the display screen 50 in real-time, as shown by the temperature gauge 58 in FIGS. 8-11. For example, the controller 35 may sample or read the data supplied by the one or more sensors ten times every second.

If the LEDs 38 never reach the first threshold temperature, T1, the curing process continues until the operation 10 is complete or otherwise stopped by the operator, as shown by step 106. If the LEDs 38 reach a first threshold temperature, T1, the controller 35 cuts power to and stops movement of the light source 36 and a notification system included in the regulation system notifies an operator that the LEDs 38 reached the first threshold temperature, T1, as shown by steps 108 and 110. The notification system notifies the operator by sending a notification signal. The notification signal may include a flashing light, audible alarm, and/or a visual message shown on the display screen 50, as shown for example by a first visual notification signal 62 in FIG. 8.

Once the operator is notified that the LEDs 38 reached the first threshold temperature, T1, the operator decides whether to continue to cure the resin at a reduced power for the light source 36 or to stop the curing processing for an extended period of time, as shown by step 112 and 114. Power to the light source 36 will remain shut down until the operator decides to continue the curing process. If using the regulation system 100, the curing process only resumes in response to input from the operator at the control center. Once resumed, the controller 35 turns the light source 36 back on at a reduced power, calculates a new and reduced retraction rate or rate of travel for the light source 36, and restarts movement of the light source 36 within the liner 14, as shown by step 116.

Continuing with FIG. 6, after the curing process is resumed, the sensors continue to measure the temperature of the LEDs 38, as shown by step 118. If a second threshold temperature, T2, is never reached, the curing process continues, as shown by step 120. If the temperature of the LEDs 38 reaches the second threshold temperature, T2, the curing process is stopped and a notification signal is again sent to the operator, as shown for example by a second visual notification signal 64 in FIG. 9 and steps 122 and 124. The operator again decides whether to continue or stop the curing process, as shown by steps 126 and 128. If the curing process is continued, the controller 35 resumes power to the light source 36 at a reduced level, calculates a new and reduced rate of travel for the light source 36, and restarts movement of the light source 36 through the liner 14, as shown by step 130.

Once the curing process is resumed a second time, the one or more sensors continue to relay the measured temperatures of the LEDs 38 to the controller 35, as shown by step 132. If a third threshold temperature, T3, is never reached, the curing process continues, as shown by step 134. If the LEDs 38 reach the third threshold temperature, T3, the curing process is stopped and a notification signal is sent to the operator, as shown for example by a third visual notification signal 66 in FIG. 10 and steps 136 and 138. The operator once again decides whether to resume or stop the curing process, as shown by steps 140, 142, and 144.

Continuing with FIG. 6, if the LEDs 38 reach all threshold temperatures programmed into the regulation system 100, the next temperature reached will be a maximum or overheat temperature, $T_{OH}$. If the curing process is continued at steps 140 and 144, the sensors continue to measure the temperature of the LEDs 38, as shown by step 146. If the overheat temperature, $T_{OH}$, is never reached, the curing process continues, as shown by step 148. If the overheat temperature, $T_{OH}$, is reached, a notification signal is sent to the operator, as shown for example by an overheat visual notification signal 68 in FIG. 11 and steps 150 and 152. The curing process is then stopped until an operator decides it is safe to continue, as shown by step 154. If the curing process is eventually continued, the regulation system 100 may be restarted.

Turning to FIG. 7, the second embodiment of the regulation system 200 is shown. The regulation system 200 is identical to the regulation system 100 shown in FIG. 6, but no operator input is required. The system 200 starts at the starting point 44 for the light source 36, as shown by step 202. If first temperature threshold, T1, is reached and the curing process is stopped, the controller 35 automatically restarts the curing process following the elapse of a desired time interval, as shown by steps 206, 210, and 212. The desired time interval may be, for example, 5 seconds. Alternatively, the desired time interval may be set to more or less than 5 seconds. An operator is not required to manually restart the curing process. Like the system 100, the curing process is restarted at a reduced power level and retraction rate, as shown by step 212. Even though the controller 35 automatically restarts the curing process when using the system 200, the operator is still sent a notification signal each time a threshold temperature is reached, as shown by steps 210, 220, and 230.

During operation of the regulation system 200, the sensors on the light source 36 continuously measure the temperature of the LEDs 38 until the maximum or overheat temperature, $T_{OH}$, is reached and the curing process is shut down, as shown by steps 204, 214, 224, 234, 236, and 242. Likewise, the curing process is automatically restarted by the controller 35 following the elapsed time interval at a reduced power and rate of travel each time a threshold temperature is reached, as shown by steps 206, 212, 216, 222, 226, and 232. If any one of the threshold temperatures, T1-T3 or the maximum temperature, $T_{OH}$, is never reached, the curing process continues, as shown by steps 208, 218, 228, and 238. While not shown in FIG. 7, an operator may also override the system 200 and shut down the curing process at any time, if desired.

Figure 8:
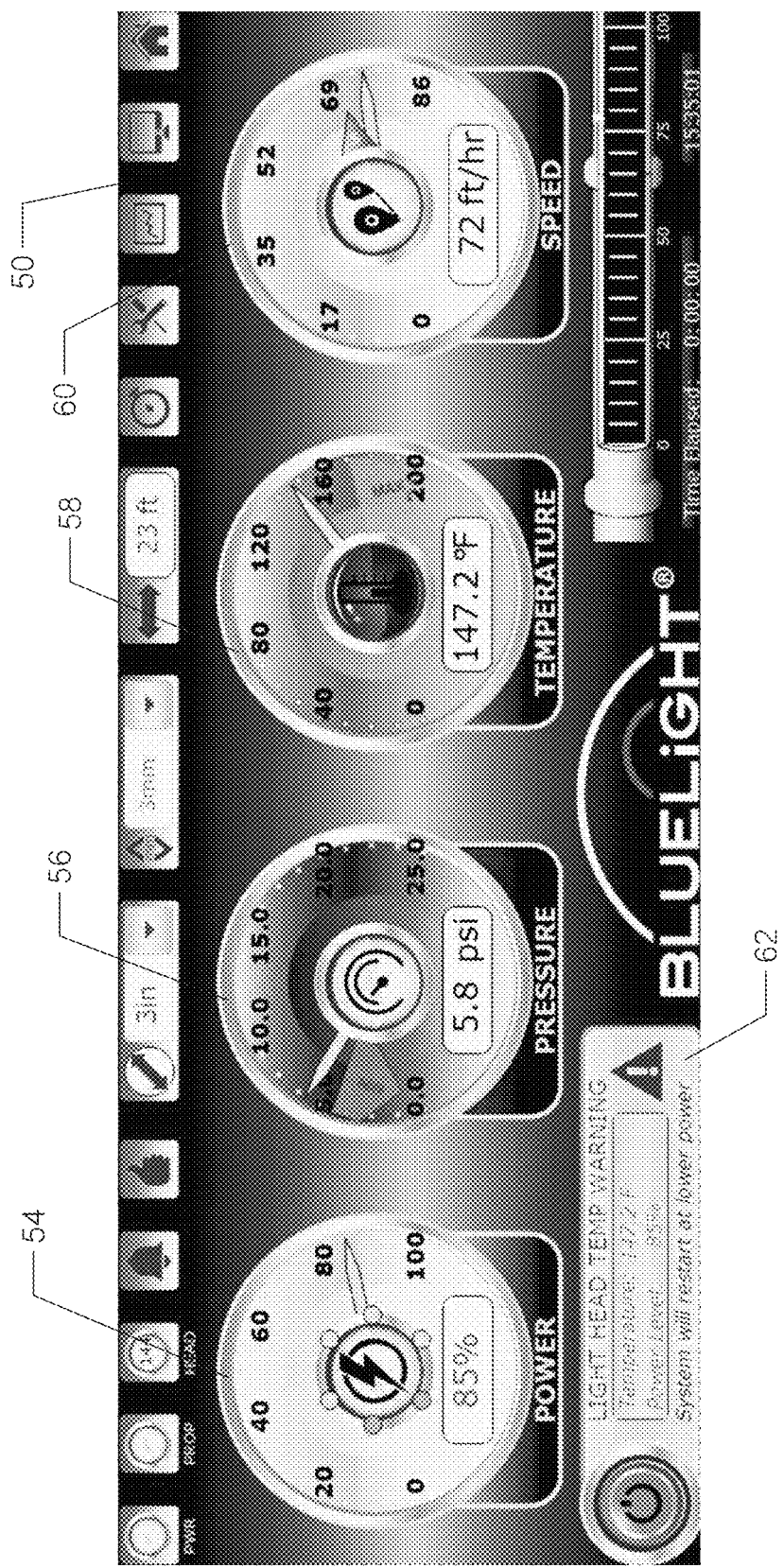
FIG. 8 is one embodiment of a display screen for use with the operation shown in FIGS. 1-5 and the regulation systems of FIGS. 6 and 7. The display screen indicates that a first temperature threshold for the light source has been reached.
Figure 9:
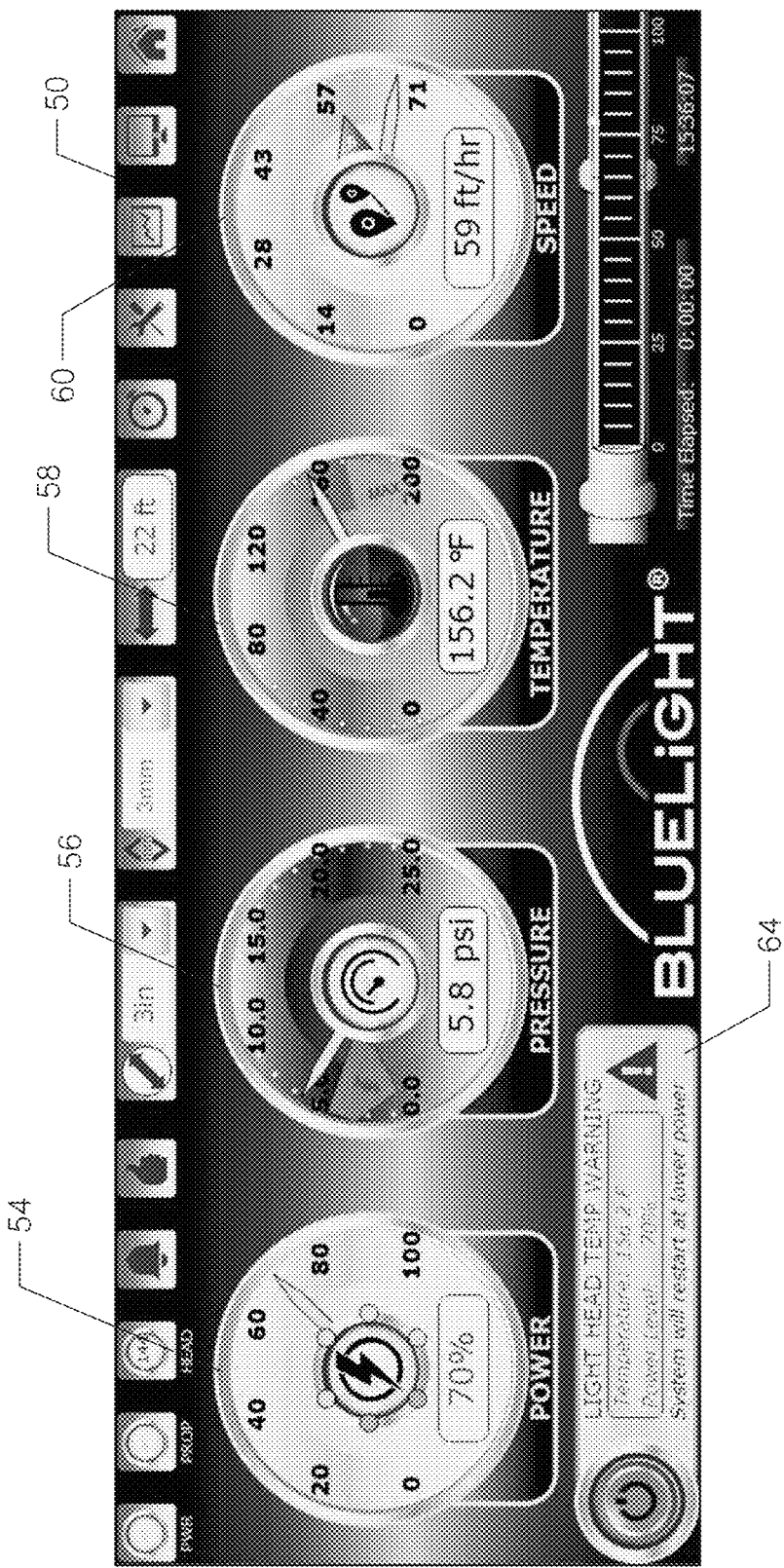
FIG. 9 is the display screen shown in FIG. 8, but at a later stage in the operation. The display screen indicates that a second temperature threshold for the light source has been reached.

Continuing with FIGS. 8-11, examples of the display screen 50 viewed by an operator during operation of the regulation system 100 or 200 are shown. In FIG. 8, the temperature of the LEDs 38 reached T1, which is 147.2° F. The curing process is then shut down for a pre-set time interval or until an operator manually restarts the curing process. When the light source 36 is turned back on, it is only powered to 85% and moved at a travel rate of 72 ft/hr through the pipeline 12. In FIG. 9, the temperature of the LEDs 38 reached T2, which is 156.2° F. The curing process is then shut down for the pre-set time interval or until an operator manually restarts the curing process. When the light source 36 is turned back on, it is only powered to 70% and moved at a travel rate of 59 ft/hr through the pipeline 12.

Figure 10:
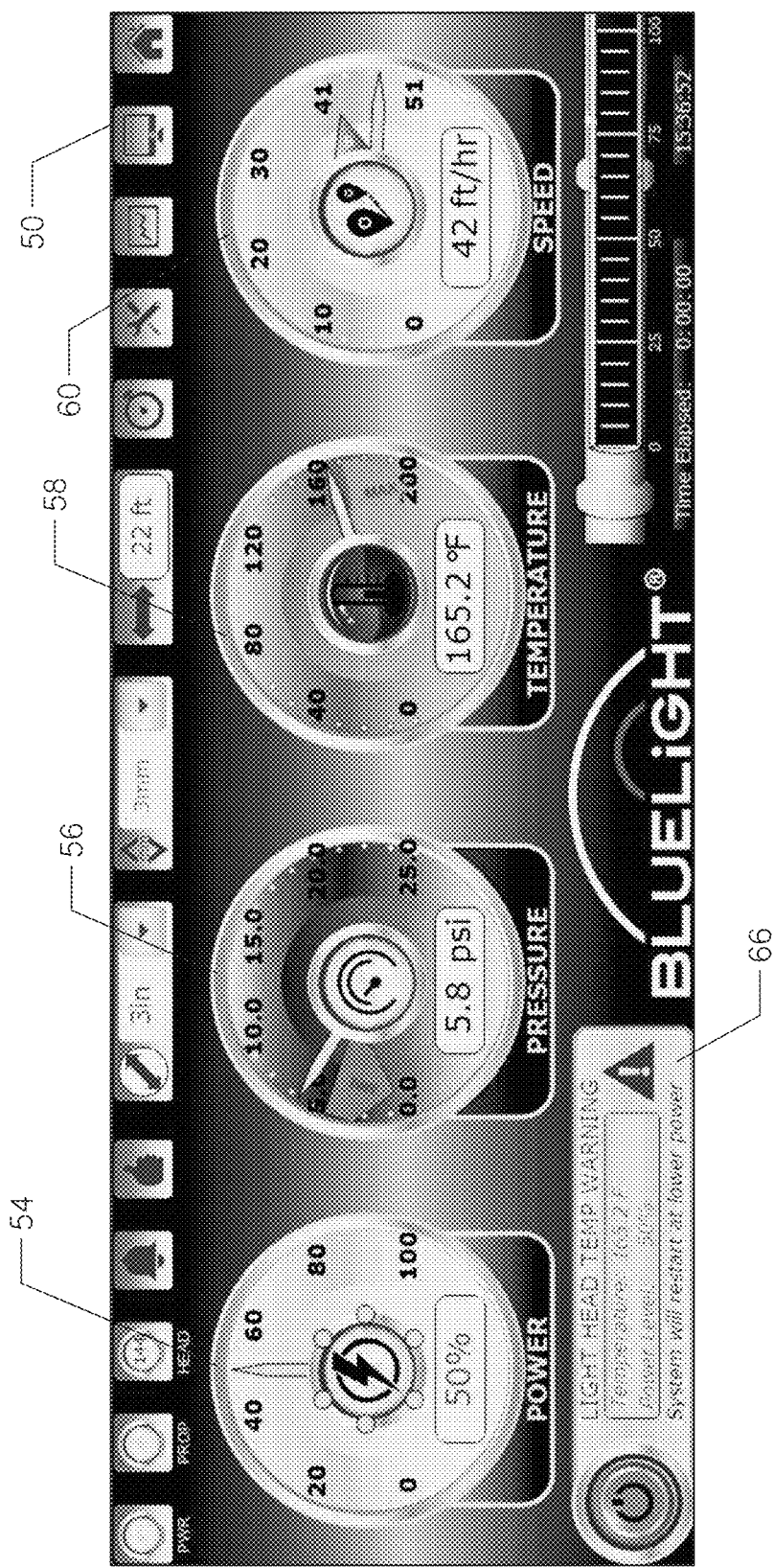
FIG. 10 is the display screen shown in FIG. 9, but at a later stage in the operation. The display screen indicates that a third temperature threshold for the light source has been reached.
Figure 11:
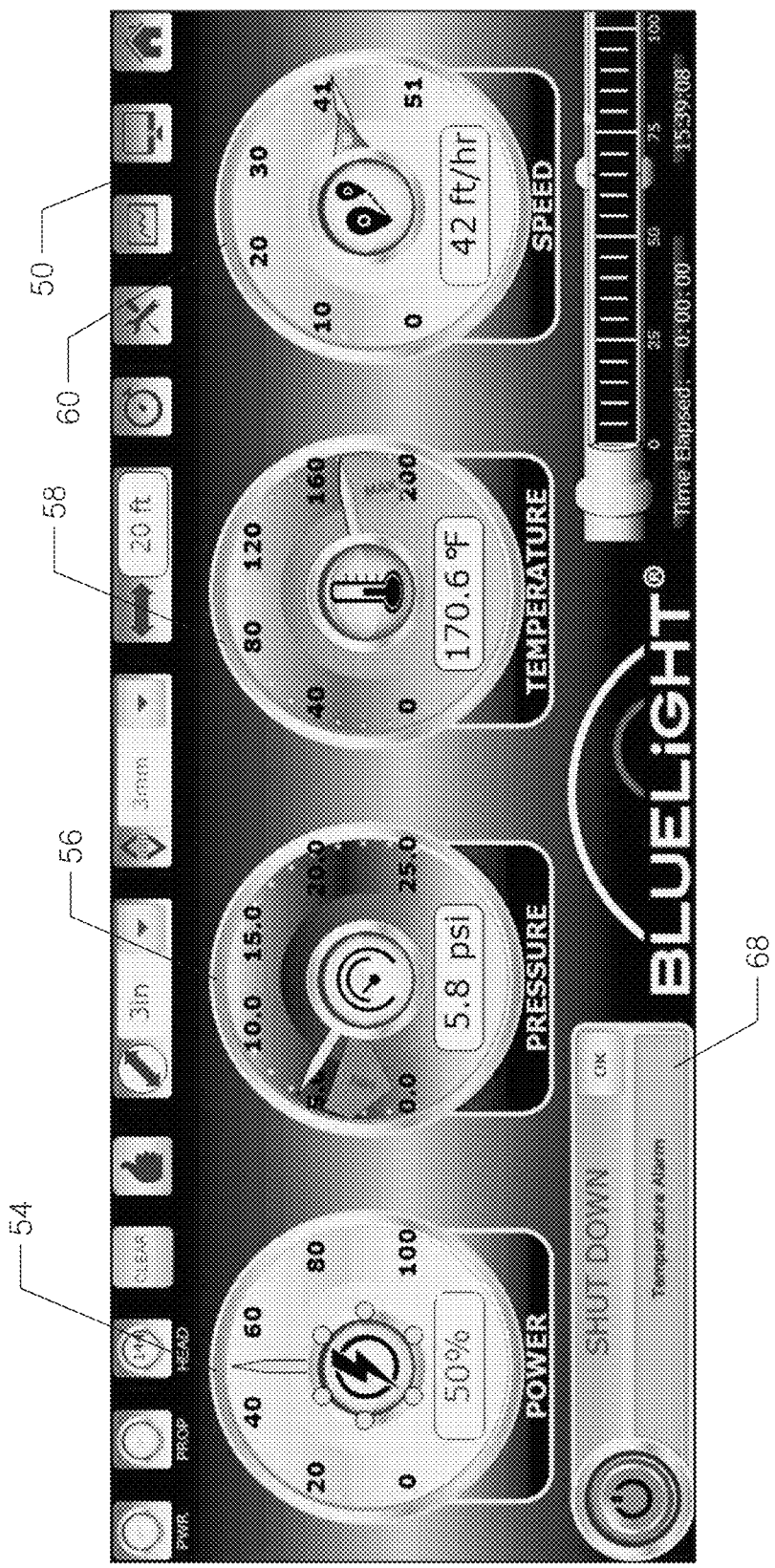
FIG. 11 is the display screen shown in FIG. 10, but at a later stage in the operation. The display screen indicates that a maximum temperature for the light source has been reached.

In FIG. 10, the temperature of the LEDs 38 reached T3, which is 165.2° F. The curing process is then shut down for the pre-set time interval or until an operator manually restarts the curing process. When the light source 36 is turned back on, it is only powered to 50% and moved at a travel rate of 42 ft/hr through the pipeline 12. Finally, in FIG. 11, the temperature of the LEDs 38 reached $T_{OH}$, which is 170.6° F. The curing process is then shut down until manually restarted by an operator.

In alternative embodiments, the regulation systems disclosed herein may be configured differently than described above. For example, in one embodiment, once each threshold temperature is reached, the power level and the rate of travel of the light source 36 are automatically reduced without stopping the curing process for any period of time. In such embodiment, the curing process may only be shut down once the LEDs 38 reach the maximum or overheat temperature. In another embodiment, the regulation system may be configured such that power to the light source 36 is only shut down when the LEDs 38 reach selected temperature thresholds. For example, the curing process may not be shut down when the first temperature threshold is reached but may be shut down when the second and third temperature thresholds are reached.

The temperate thresholds, power output levels, and retraction rates may vary from those shown in FIGS. 8-11. In operation, an operator may set a maximum allowed temperature threshold and the amount of threshold increments desired. The regulation system may then calculate the most efficient temperature thresholds, power output levels, and retraction rates for the conditions of the current operation. Alternatively, an operator may manually set the temperature thresholds, power output levels, and travel rates, if desired. The regulation systems disclosed herein may also be pre-programmed to use the same data points with each operation. An operator may also manually override the systems disclosed herein to modify any temperature, power, and speed values set by the controller 35, if desired.

The various features and alternative details of construction of the apparatuses described herein for the practice of the present technology will readily occur to the skilled artisan in view of the foregoing discussion. It is to be understood that even though numerous characteristics and advantages of various embodiments of the present technology have been set forth in the foregoing description, together with details of the structure and function of various embodiments of the technology, this detailed description is illustrative only, and changes may be made in detail. Changes may be made in detail especially in matters of structure and arrangements of parts within the principles of the present technology to the full extent indicated by the broad general meaning of the terms in which the appended claims are expressed.

The invention claimed is:

1. A system, comprising:
a pressurized chamber having a reel installed therein;
a flexible tubular liner configured to be wound around the reel, the liner being extendable into an elongate configuration;
a light source attached to a power line and comprising a plurality of light emitting diodes, the light source and the power line configured to extend within the liner when the liner is in the elongate configuration;
a propulsion unit configured to move the light source within the liner at a desired rate of travel; and
a controller in communication with the light source and the propulsion unit, the controller configured to monitor a temperature of an area adjacent the light emitting diodes, to shut down power to the light emitting diodes and stop movement of the light source if the temperature reaches a first temperature threshold, and to thereafter resume power to the light emitting diodes at a decreased power output and resume movement of the light source at a decreased rate of travel.

2. The system of claim 1, in which the controller is further configured to shut down power to the light emitting diodes and to stop movement of the light source if the temperature reaches a second temperature threshold, and to thereafter resume power to the light emitting diodes at a decreased power output and to resume movement of the light source at a decreased rate of travel.

3. The system of claim 2, in which the second temperature threshold is a higher temperature than the first temperature threshold.

4. The system of claim 2, in which the controller is further configured to shut down power to the light emitting diodes and to stop movement of the light source if the temperature reaches a third temperature threshold, and to thereafter resume power to the light emitting diodes at a decreased power output and to resume movement of the light source at a decreased rate of travel.

5. The system of claim 4, in which the second temperature threshold is a higher temperature than the first temperature threshold; and in which the third temperature threshold is a higher temperature than the second temperature threshold.

6. The system of claim 4, in which the controller is further configured to shut down power to the light emitting diodes and to stop movement of the light source if the temperature reaches a maximum temperature.

7. The system of claim 6, in which the second temperature threshold is a higher temperature than the first temperature threshold; in which the third temperature threshold is a higher temperature than the second temperature threshold; and in which the maximum temperature is a higher temperature than the third temperature threshold.

8. The system of claim 1, further comprising:
a monitor in communication with the controller, the monitor configured to display the rate of travel of the light source, the temperature of the area adjacent the light emitting diodes, and the power output of the light emitting diodes in real-time.

9. The system of claim 8, further comprising:
a notification system controlled by the controller and configured to send a signal to a human user of the system if the temperature adjacent the light emitting diodes reaches the first temperature threshold; and
in which the signal is displayed on the monitor.

10. The system of claim 1, further comprising:
a notification system controlled by the controller and configured to send a signal to a human user of the system if the temperature adjacent the light emitting diodes reaches the first temperature threshold.

11. The system of claim 10, in which the signal is an audible alarm.

12. The system of claim 8, further comprising:
a control center in communication with the controller and the monitor;
in which power is resumed to the light emitting diodes in response to input at the control center from a human user of the system.

13. The system of claim 12, in which the control center is an interface on the monitor.

14. The system of claim 1, in which power to the light emitting diodes and movement of the light source is automatically resumed after a predetermined time interval.

15. The system of claim 14, in which the predetermined time interval is less than 10 seconds.

16. An apparatus, comprising:
a controller configured to be in communication with a light source comprising a plurality of light emitting diodes and a propulsion unit mechanically coupled to the light source;
in which the light source is configured to be installed within a tubular liner positioned below a ground surface and configured to be moved at a rate of travel within the liner by the propulsion unit;
in which the controller is configured to monitor a temperature of an area adjacent the light emitting diodes, to shut down power to the light emitting diodes and stop movement of the light source if the temperature reaches a first temperature threshold, and to thereafter resume power to the light emitting diodes at a decreased power output and resume movement of the light source at a decreased rate of travel.

17. The apparatus of claim 16, in which the controller is further configured to shut down power to the light emitting diodes and to stop movement of the light source if the temperature reaches a second temperature threshold, and to thereafter resume power to the light emitting diodes at a decreased power output and to resume movement of the light source at a decreased rate of travel.

18. The apparatus of claim 17, in which the second temperature threshold is a higher temperature than the first temperature threshold.

19. The apparatus of claim 16, in which power to the light emitting diodes and movement of the light source is automatically resumed after a predetermined time interval.

20. The apparatus of claim 19, in which the predetermined time interval is less than 10 seconds.

\* \* \* \* \*